COLLAPSIBLE BAG
Original Filed Feb. 15, 1963 2 Sheets-Sheet 1
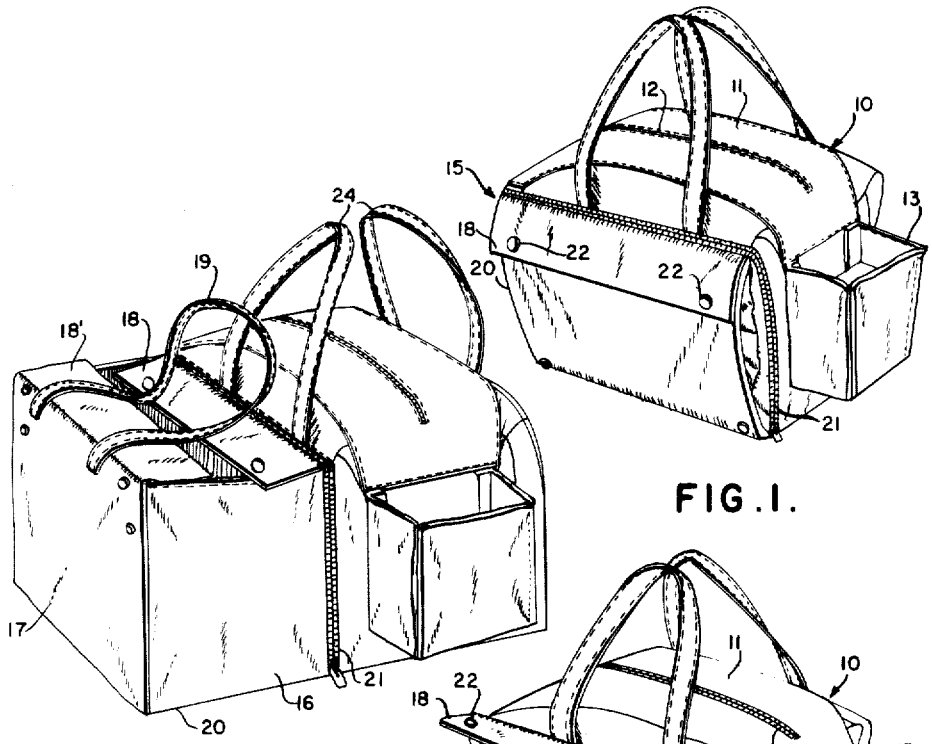
FIG. 1.
FIG. 2.
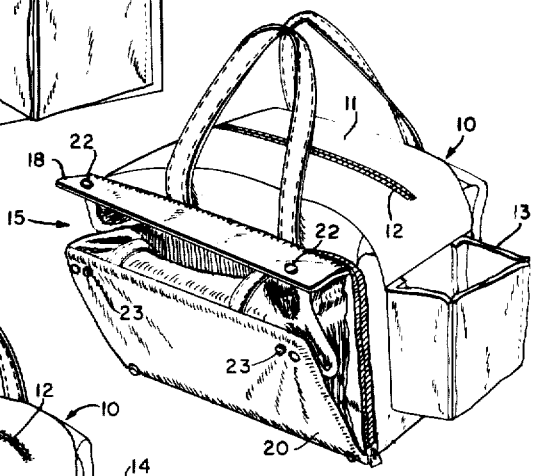
FIG. 3.
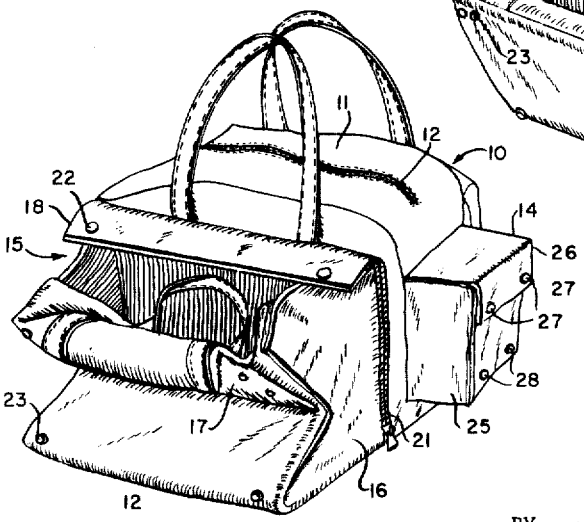
FIG. 4.
INVENTOR
Charles W. Ward
BY Holcombe, Wetherill & Brisebois
ATTORNEYS

COLLAPSIBLE BAG

Original Filed Feb. 15, 1963 2 Sheets-Sheet 2

INVENTOR
Charles W. Ward

BY Holcombe Wetherill & Brisebois
ATTORNEYS

United States Patent Office

Re. 25,826
Reissued Aug. 3, 1965

25,826
COLLAPSIBLE BAG

Charles W. Ward, 608 Oakland Ave., Sandusky, Ohio

Original No. 3,122,225, dated Feb. 25, 1964, Ser. No. 258,732, Feb. 15, 1963. Application for reissue Apr. 17, 1964, Ser. No. 373,119
7 Claims. (Cl. 190—52)

Matter enclosed in heavy brackets [ ] appears in the original patent but forms no part of this reissue specification; matter printed in italics indicates the additions made by reissue.

This invention relates to luggage and more in particular to hand luggage. The particular type of hand luggage disclosed in this invention has one or more collapsible compartments that are retained against or recessed into the sides of the supporting bag.

Heretofore bags with expandable sides have been designed for specific purposes, such as brief cases. Some hand luggage has had an expansible side so as to increase the capacity of the main compartment of the bag. This is not an object of the present invention.

It is an object of the present invention to provide a bag having one or more compartments that are attached to and separate from the main carrying space of the principal bag. They are permanently or detachably attached to the exterior side wall of the principal bag.

It is a further object of this invention to provide auxiliary bags that may be carried in conjunction with the principal bag until their time for use occurs. These bags are then expandable and provide a separate carrying compartment in addition to the compartment of the principal bag.

The various features of novelty which characterize this invention are pointed out with particularly in the claims annexed to and forming a part of this specification. For a better understanding of the invention, however, its advantages and specific objects attained with its use, reference should be had to the accompanying drawings and descriptive matter in which have been illustrated and described a preferred embodiment of the invention.

Referring to the drawings:

FIG. 1 is a perspective view of the bag with the side compartment collapsed.

FIG. 2 is a perspective view with the side compartment expanded.

FIG. 3 is a perspective view with the side compartment partially collapsed.

FIG. 4 is a perspective view showing the method of folding the side compartments.

Figure 5:
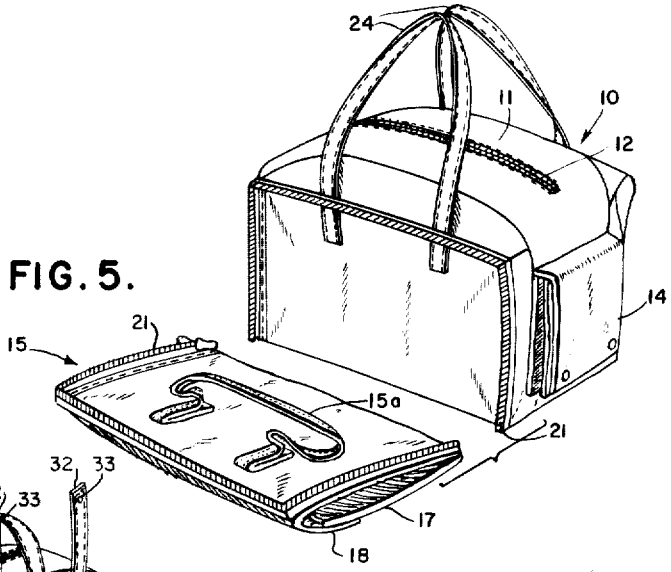
FIG. 5 is a perspective view showing the side compartment detached.

The principal bag 10 has a body portion 11 with a zipper closure 12 across the top thereof. The end compartment 13 is collapsible against the end of the bag, as shown in FIG. 5, and is held in position by the cover portion 14 thereof. The principal bag 10 has a reinforced rigid bottom (not shown) which supplies rigidity to the structure. The side compartment 15 comprises two end panels 16, 16, a side panel 17 and two flaps 18 and 18'. Attached to the side panel 17 is the carrying strap 19, all of these panels are made of flexible material. The bottom panel 20 has a reinforcing rigid member therein. The side compartment 15 is releasably attached to the bag 10 by means of the zipper fastener 21. The flap 18 has two snap fasteners 22, 22 thereon, which are attached to the studs 23, 23 on the outside of the bottom portion and retain the end panels 16, 16 and the side panel 17 in a collapsed position, as shown in FIG. 1.

When it is desired to open the side compartment 15 from its collapsed position, shown in FIG. 1, to the position shown in FIG. 2, the snaps 22, 22 are unfastened from the studs 23, 23 and the side compartment opens. The carrying strap 19 is then removed and the flap 18' removed from the inside of the side compartment. This compartment is then ready to receive any articles that it is desired to place therein.

When it is desired to fold this compartment back against the bag 10 it is emptied and the flap 18 and the carrying strap 19 are folded therein. The side panel 17 is then folded lengthwise of the panel inwardly, as shown in FIG. 4. The bottom panel 20 is then raised to occupy the position shown in FIG. 3 and the snap fasteners 22, 22 receive the studs 23, 23 to hold this panel in position.

The rigid bottom member allows this bag to carry a substantial weight with an equal distribution of the load between the carrying strap 19 and the carrying straps 24, 24 of the bag 10. After this side compartment 15 is collapsed it may be released from the bag 10 by opening the zipper 21, as shown in FIG. 5. The side compartment 15 has an auxiliary carrying strap **15*a* attached thereto, as shown in FIG. 5, thereby making it useable as a separate bag when detached. The end compartment 13 has the flap portion 14 thereon. This end compartment may be collapsed against the end of the bag 10 by folding the side panels 25, 25 and the bottom panel (not shown) and extending the flap portion 26 downwardly so that the snap buttons 27, 27 receive the studs 28, 28**, mounted on the lower portion of the end compartment. This then takes the position shown in FIG. 5.

The particular bag illustrated in FIGS. 1 to 5 inclusive is made to carry shot gun shells. The end compartment 13 is of just sufficient size to hold a box of shells. The bag 10 with its rigid bottom is of sufficient size to hold a number of boxes of shot gun shells. The side compartment when extended will hold the same number of boxes of shells as does the main bag 10. This allows the trap or skeet shooter to remove one box of shells, place it in the end compartment, fire the 25 shells usually boxed therein and then to place the empty shells in the side compartment. In this manner there is no danger of confusing the box of empty shells with the box of loaded shells and both of them are immediately available. This is particularly valuable to those discriminating shooters who prefer to reload their own shells.

While in the above description of the use of this bag, its particular application to a shot gun shooter has been used as an example, it is also extensively used by an ordinary traveler where it is desired to open the side compartment to retain dirty clothes separate and distinct from the clean clothes retained in the main bag.

Figure 6:
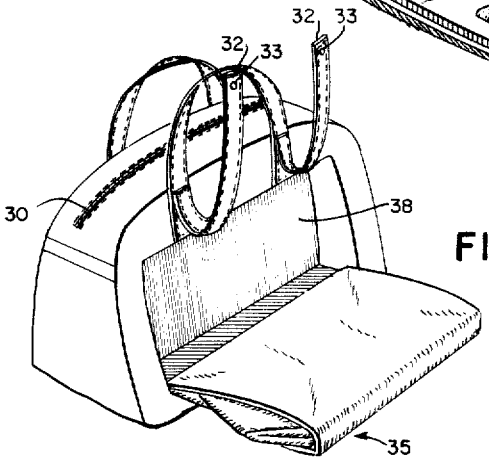
FIG. 6 is a perspective view of a modification of the bag shown in FIG. 1, wherein the side compartment is recessed into the principal bag.
Figure 7:
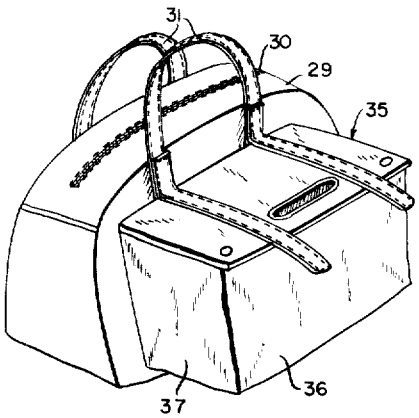
FIG. 7 is a perspective view of the bag shown in FIG. 6 with the side compartment expanded.
Figure 8:
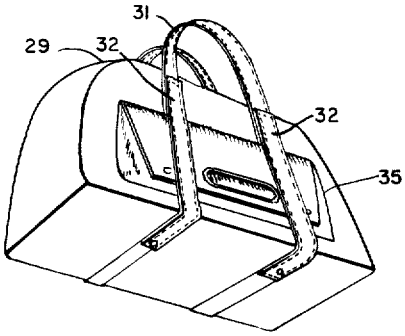
FIG. 8 is a perspective view showing the method of retaining the side compartment, shown in FIG. 6, in position.

The modification shown in FIGS. 6, 7 and 8 is quite similar to the bag shown in FIGS. 1 to 5. This bag has the main body portion 29 with a zipper closure 30 and the two carrying straps 31, 31. The two retaining straps 32, 32 are attached to the side of the bag, as shown in FIG. 6 and have the snap buttons 33 near the end thereof. The side compartment 35 has the side panels 36 and the end panels 37, 37 thereon. A bottom panel (not shown) is made of rigid material to add strength to the bag. The main bag has the recessed side portion 38 therein, as shown in FIG. 6. When this bag is open, as shown in FIG. 7, and it is desired to collapse the side compartment 35, the side panel 36 is creased lengthwise and the end panels 37, 37 are also creased lengthwise. This allows the bag to assume the position shown in FIG. 6 and the bottom portion is then raised and the side compartment occupies the recessed portion and is retained therein by means of the straps 32, 32 passing over the outside surfaces of the side compartment and the snap buttons 33, 33 receiving the studs appropriately placed on the bottom panel of the main bag to retain this in its collapsed recessed position, shown in FIG. 8.

This small bag may be expanded by opening the side compartments thereof at any time to receive therein any articles that it is desired to store and carry separately and distinct from the main bag 29.

While in the above description zippers and snap fasteners have been used to describe the preferred embodiment of the invention, other types of fasteners may be used and this invention is not limited to the particular type of fastener shown for purposes of illustration.

While in accordance with the provisions of the statutes, there has been illustrated and described the best form of embodiment of this invention now known, it will be apparent to those skilled in the art that changes may be made in the form or size of the apparatus disclosed without departing from the spirit of this invention as set forth in the appended claims and that in some cases certain features of the invention may be used to advantage without a corresponding use of other features.

What is claimed is:

1. In a portable hand bag, the combination of (1) a principal bag having
- (a) a rigid bottom panel,
- (b) two flexible side panels,
- (c) a continuous panel across the top and down each end attached to the bottom panel, a closable opening in the top of said continuous panel,
- (d) carrying straps attached to each side panel and overlying the continuous panel,
- (e) a retaining means on at least one of said side panels;

(2) a detachable collapsible exterior side compartment comprising,
- (a) a rigid bottom panel,
- (b) two side panels, at least one of which is flexible,
- (c) two flexible end panels,
- (d) a flexible cover panel,
- (e) one of said side panels being equipped with a fastener to match with and fasten said side compartments to the side panel of said principal bag which is equipped with the matching fastener, and
- (f) said cover panel for said side compartment having two straps thereacross with holding means in the end thereof to be received by suitable holding means on the exterior surface of said bottom panel to hold said side compartment in a collapsed position against the side panel of said principal bag.

2. In a portable hand bag, the combination of (1) a principal bag having
- (a) a rigid bottom panel,
- (b) a plurality of side panels,
- (c) top and end panels attached to the bottom panel, a closable opening in the top of said top panel,
- (d) carrying straps attached to each side panel and overlying the top panel,
- (e) a retaining means on at least one of said side panels;

(2) a detachable collapsible exterior side compartment comprising,
- (a) a rigid bottom panel,
- (b) a plurality of side panels, at least one of which is flexible,
- (c) flexible end and cover panels,

- (d) one of said side panels being equipped with a fastener to match with and fasten said side compartments to the side panel of said principal bag which is equipped with the matching fastener, and
- (e) said cover panel for said side compartment being equipped with holding means to retain said side compartment in a collapsed position against the side panel of said principal bag.

3. In a portable hand bag, the combination of (1) a principal bag having
- (a) a rigid bottom panel,
- (b) two flexible side panels,
- (c) a continuous panel across the top and down each end attached to the bottom panel, a closable opening in the top of said continuous panel,
- (d) carrying straps attached to each side panel and overlying the continuous panel,
- (e) one of said side panels having a recess portion therein, (2) an exterior side compartment comprising,
- (a) a rigid bottom panel,
- (b) two flexible side panels,
- (c) two flexible end panels,
- (d) a flexible cover panel,
- (e) one of said side panels being attached to the inner edge of said recessed portion in the side panel of said principal bag, and
- (f) said cover panel for said side compartment[s] having two straps thereacross with holding means in the end thereof to be received by suitable holding means on the exterior surface of said bottom panel to hold said collapsed side compartment within said recessed portion in the side panel of said principal bag.

4. In a portable hand bag, the combination of (1) a principal bag having
- (a) a *flat* rigid bottom panel,
- (b) a plurality of *side* [top] and end panels attached to the bottom panel,
- (c) carrying straps attached to [each] *two of said* side *panels* [panel] and overlying the *principal bag* [top panel],
- (d) one of said side panels having a recess portion therein, (2) an exterior side compartment comprising,
- (a) a *flat* rigid bottom panel,
- (b) a plurality of side panels at least one of which is flexible,
- (c) flexible end [and cover] panels,
- (d) one of said side panels being attached to the inner edge of said recessed portion in the side panel of said principal bag, and
- (e) *strap means extending across said flat rigid bottom and having holding means thereon to attach with holding means on the principal bag to retain said* [said cover panel for said side compartments being equipped with holding means to retain said] side compartment within said recessed portion in the said side panel of said principal bag.

*5. In a flat rigid portable handbag, the combination of a principal bag having a bottom and a plurality of outer walls and an opening therein, carrying means operatively associated with the principal bag and adapted to be gripped for carrying the bag, a collapsible exterior compartment on said principal bag comprising a rigid bottom, flexible side and end walls and having an opening therein, said rigid bottom of said compartment being movable from an open position extending outwardly from and generally parallel to said flat rigid bottom of the principal bag to a collapsed position lying along a wall of said principal bag, said flexible walls being moved to a collapsed position upon movement of said rigid bottom to its said collapsed position, and strap means ex-*

*tending across said rigid bottom when in its collapsed position and having holding means thereon to attach with holding means on the principal bag to retain said compartment in its collapsed position.*

*6. In a portable handbag, the combination of a principal bag having a flat rigid bottom and a plurality of outer walls and an opening therein, carrying means operatively associated with the principal bag and adapted to be gripped for carrying the bag, a detachable collapsible exterior compartment on said principal bag comprising a rigid bottom, a pair of flexible side walls and two flexible end walls, and having an opening therein, means for detachably connecting one of said side walls to one of said outer walls of said principal bag, said rigid bottom of said compartment being movable from an open position extending outwardly from the principal bag to a collapsed position lying along said one wall of said principal bag, holding means overlapping said rigid bottom when in its collapsed position and having means thereon to attach with means on the principal bag to retain said compartment in its collapsed position.*

*7. In a portable handbag, the combination of a principal bag having a bottom and a plurality of outer walls, and an opening therein, carrying means operatively associated with the principal bag and adapted to be gripped for carrying the bag, a detachable collapsible exterior compartment on said principal bag comprising a rigid*

*bottom, a plurality of flexible side walls and two flexible end walls, and having an opening therein, means for detachably connecting said exterior compartment to said principal bag, said rigid bottom of said compartment being movable from an open position extending outwardly from the principal bag to a collapsed position lying along a wall of said principal bag, and means operatively associated with said side compartment for holding the side compartment in its collapsed position.*

References Cited by the Examiner

The following references, cited by the Examiner, are of record in the patented file of this patent or the original patent.

UNITED STATES PATENTS

| | | | |
|---|---|---|---|
| 920,852 | 5/09 | Flanagan | 190—44 |
| 2,597,194 | 5/52 | Sholl | 190—52 |
| 2,721,596 | 10/55 | Daniel | 150—35 |
| 2,865,433 | 12/58 | Warner | 190—42 |
| 3,061,057 | 10/62 | Miller | 190—52 |

FOREIGN PATENTS

| | | |
|---|---|---|
| 838,849 | 6/60 | Great Britain. |

JOSEPH R. LECLAIR, *Primary Examiner.*

FRANKLIN T. GARRETT, *Examiner.*